United States Patent
Proctor, Jr. et al.

(10) Patent No.: US 7,916,772 B2
(45) Date of Patent: Mar. 29, 2011

(54) METHOD FOR SEARCHING PILOT SIGNALS TO SYNCHRONIZE A CDMA RECEIVER WITH AN ASSOCIATED TRANSMITTER

(75) Inventors: James Proctor, Jr., Indialantic, FL (US); Antoine J. Rouphael, Escondido, CA (US); John E. Hoffmann, Indialantic, FL (US); George Nelson, Jr., Merritt Island, FL (US)

(73) Assignee: IPR Licensing, Inc., Wilmington, DE (US)

( * ) Notice: Subject to any disclaimer, the term of this patent is extended or adjusted under 35 U.S.C. 154(b) by 0 days.

(21) Appl. No.: 11/818,293

(22) Filed: Jun. 14, 2007

(65) Prior Publication Data
US 2008/0225991 A1 Sep. 18, 2008

Related U.S. Application Data

(63) Continuation of application No. 09/789,476, filed on Feb. 20, 2001, now Pat. No. 7,233,627.

(60) Provisional application No. 60/184,363, filed on Feb. 23, 2000.

(51) Int. Cl.
*H04B 1/00* (2006.01)
*H04B 7/02* (2006.01)
*H04B 7/10* (2006.01)

(52) U.S. Cl. .................... 375/148; 375/267; 375/347

(58) Field of Classification Search .............. 375/267, 375/147, 152, 148, 149, 347
See application file for complete search history.

(56) References Cited

U.S. PATENT DOCUMENTS

| | | | |
|---|---|---|---|
| 5,617,102 A | 4/1997 | Prater | |
| 5,691,974 A | 11/1997 | Zehavi et al. | |
| 5,739,788 A | 4/1998 | Dybdal et al. | |
| 5,933,112 A | 8/1999 | Hiramatsu et al. | |
| 5,995,483 A * | 11/1999 | Marchok et al. | 370/207 |
| 6,009,124 A * | 12/1999 | Smith et al. | 375/267 |
| 6,061,553 A | 5/2000 | Matsuoka et al. | |
| 6,100,843 A | 8/2000 | Proctor et al. | |
| 6,141,374 A * | 10/2000 | Burns | 375/152 |
| 6,144,691 A | 11/2000 | Kenney | |
| 6,175,561 B1 | 1/2001 | Storm et al. | |
| 6,191,736 B1 | 2/2001 | Yukimoto et al. | |
| 6,606,363 B1 * | 8/2003 | Atarius et al. | 375/362 |
| 7,233,627 B2 * | 6/2007 | Proctor et al. | 375/267 |
| 2004/0264554 A1 * | 12/2004 | Harms et al. | 375/147 |

FOREIGN PATENT DOCUMENTS
KR 2001-0076757 8/2001

OTHER PUBLICATIONS

Proakis, *Digital Communications*, Chapter 15, "Multiuser Communications", McGraw-Hill International Edition, Electronical Engineering Series, Fourth Edition, pp. 896-938, (2001). Telecommunications Industry Association, "TIA/EIA Interim Standard, Mobile Station-Base Station Compatibility Standard for Dual-Mode Wideband Spread Spectrum Cellular System", TIA/EIA/IS-95-A, (May 1995).

* cited by examiner

*Primary Examiner* — Don N Vo
(74) *Attorney, Agent, or Firm* — Volpe and Koenig, P.C.

(57) ABSTRACT

A method for synchronizing a CDMA receiver to a transmitter when an adaptive antenna is utilized to receive transmitted data, wherein a receiving antenna system is adapted between a 360° reception angle pattern (i.e., an omni-directional pattern) and a fixed reception angle (i.e., a directional pattern) by permitting the receiver to identify a pilot signal having the largest magnitude. The receiver minimizes interference from other pilot signals by steering antenna pattern nulls toward other transmitters. As a result, the time required for the receiver to acquire a valid pilot signal is significantly reduced.

9 Claims, 9 Drawing Sheets

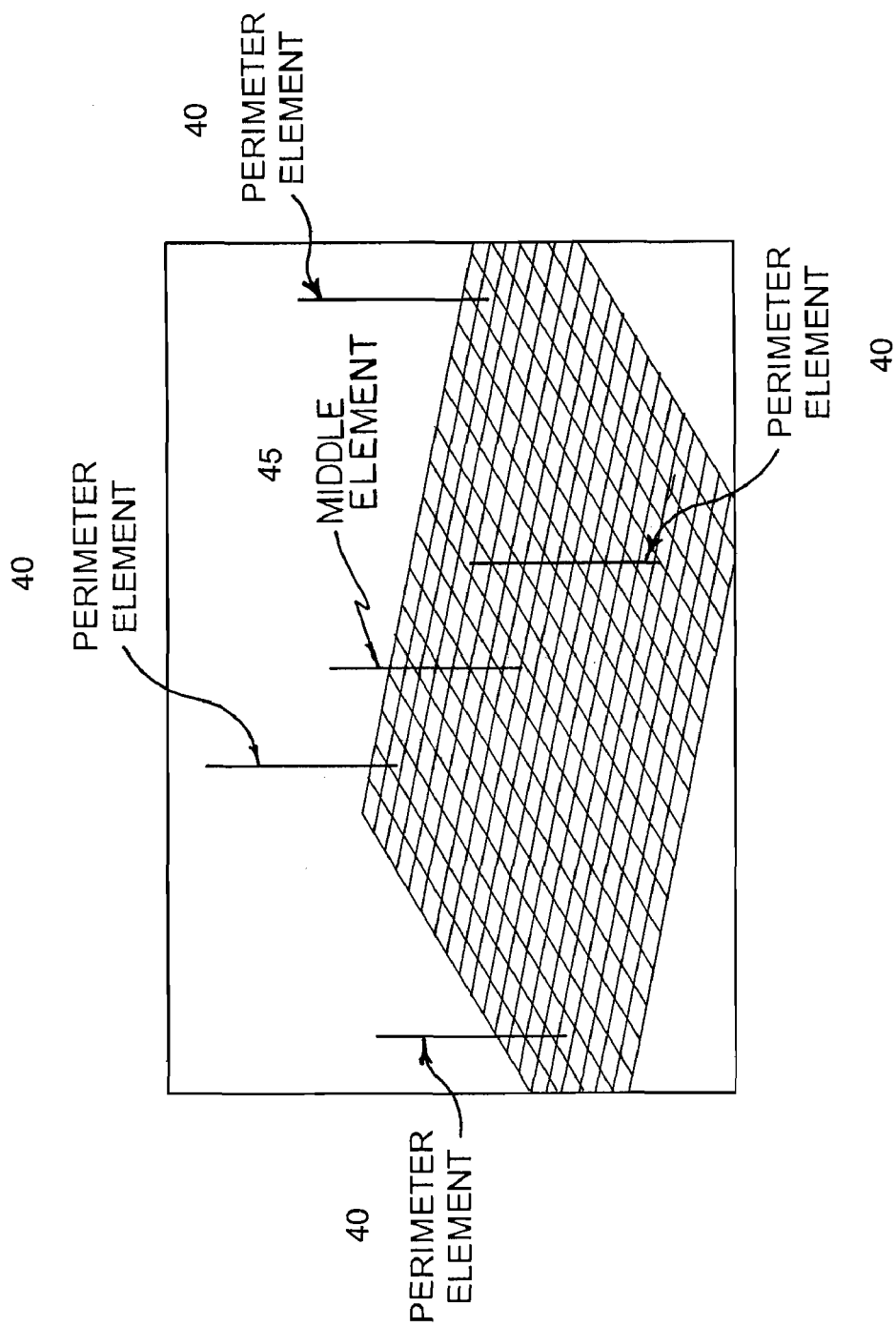

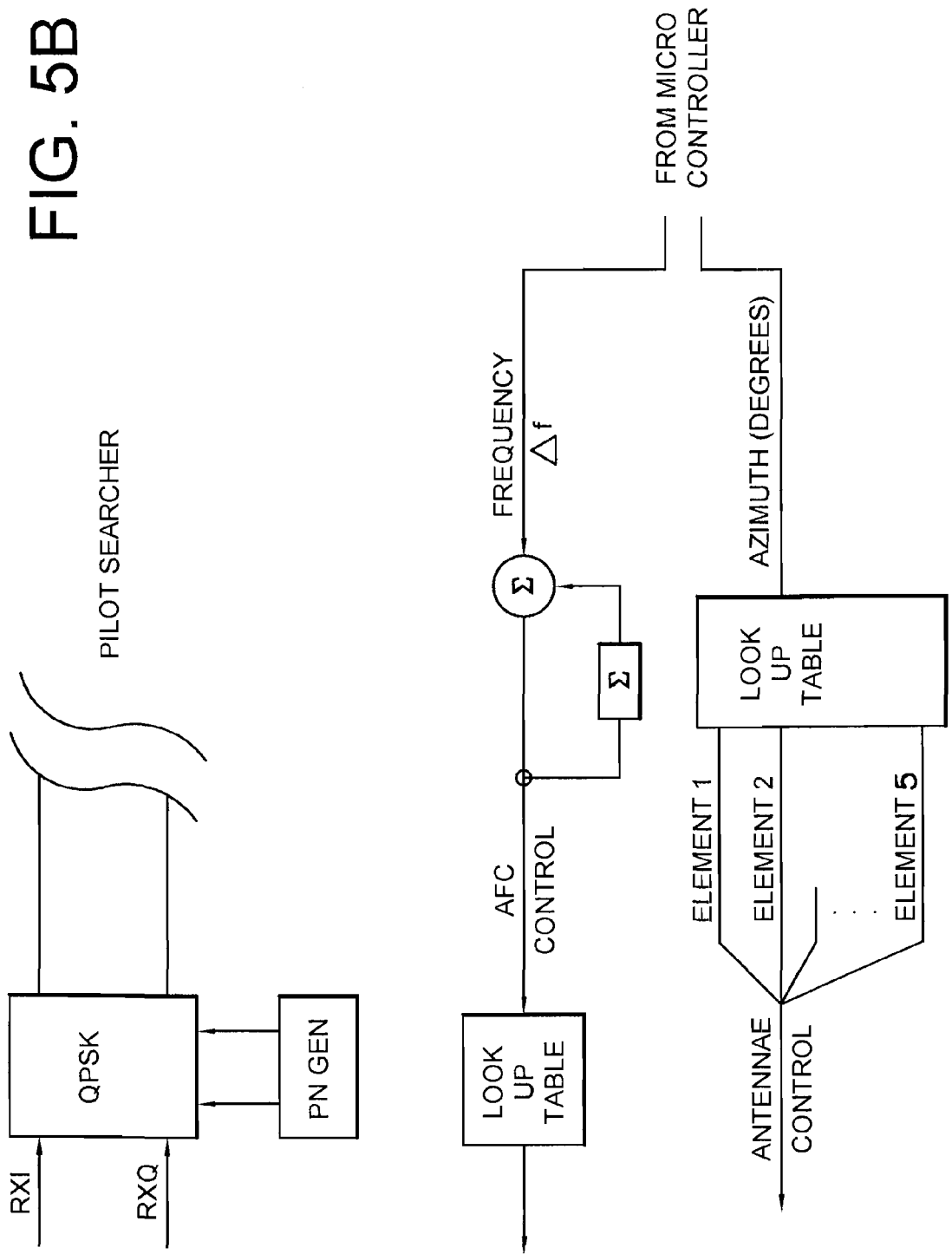

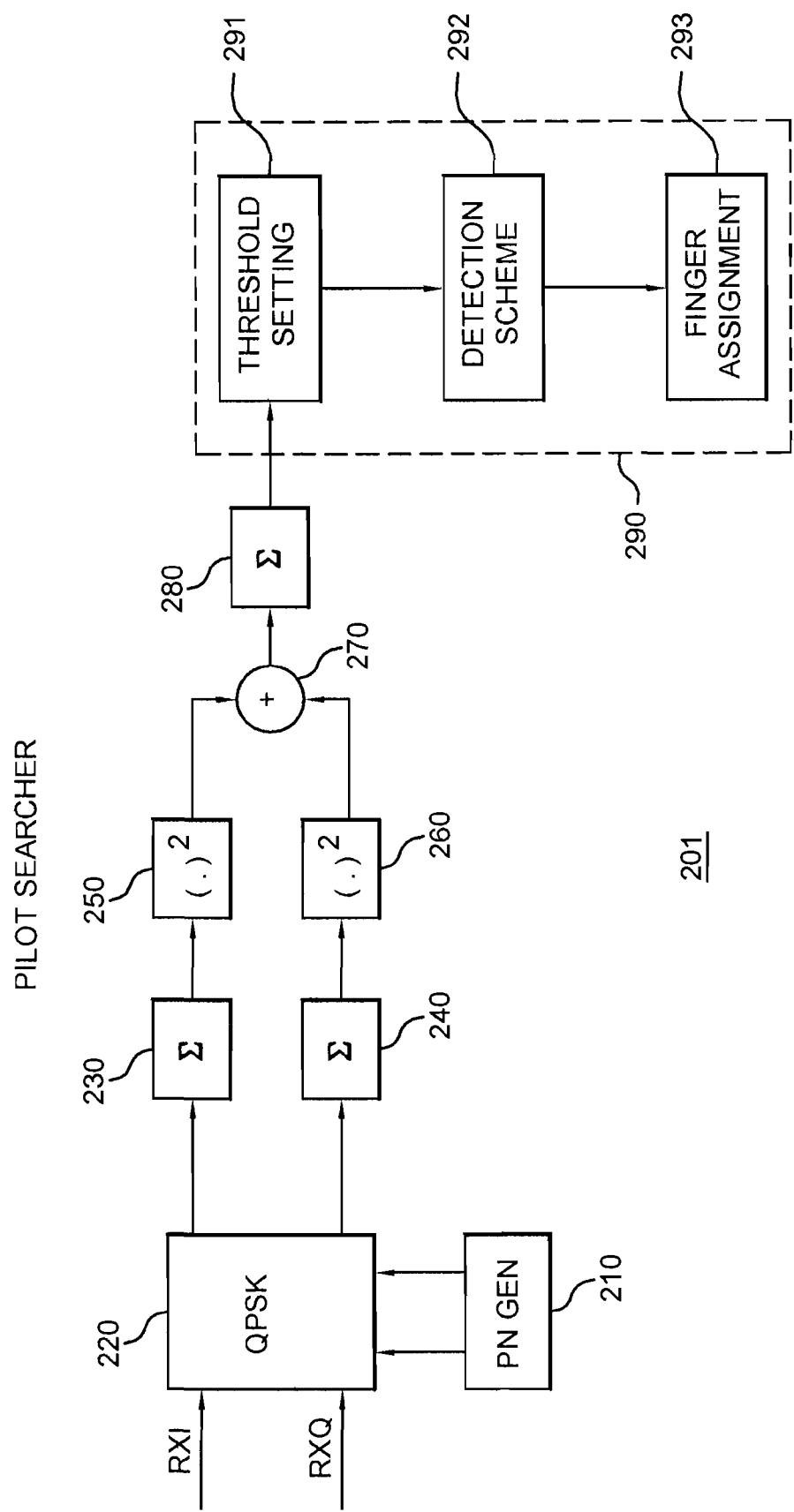

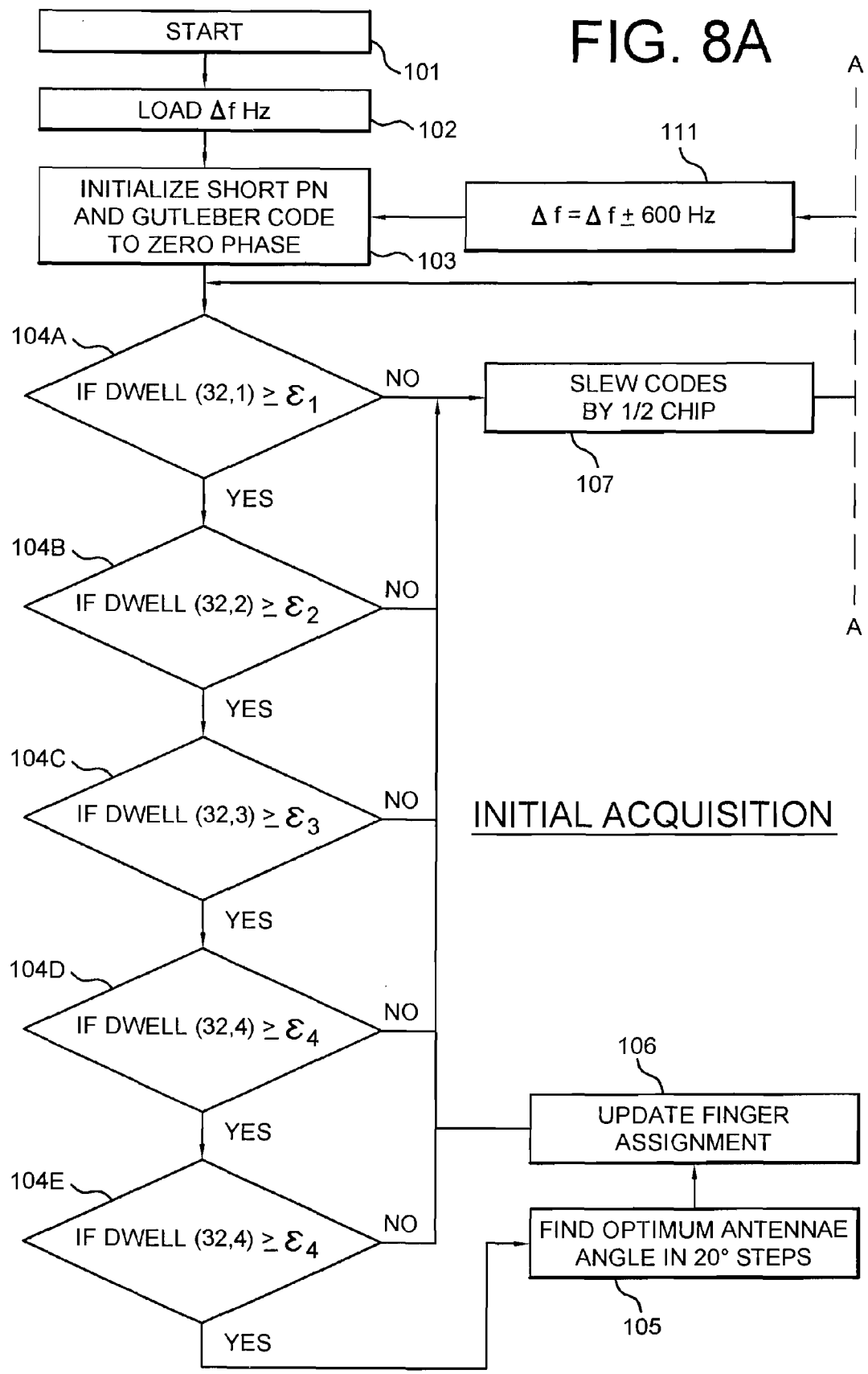

METHOD FOR SEARCHING PILOT SIGNALS TO SYNCHRONIZE A CDMA RECEIVER WITH AN ASSOCIATED TRANSMITTER

CROSS REFERENCE TO RELATED APPLICATION(S)

This application is a continuation of U.S. patent application Ser. No. 09/789,476 filed on Feb. 20, 2001 which claims the benefit of U.S. Provisional Application No. 60/184,363 filed on Feb. 23, 2000, which are incorporated by reference as if fully set forth.

FIELD OF INVENTION

The present invention generally relates to the field of data communications and processing and, more particularly, to a method for synchronizing a CDMA receiver to a transmitter when an adaptive antenna is utilized to receive transmitted data.

BACKGROUND

Code Division Multiple Access (CDMA) modulation is a multi-user access transmission scheme in which different users of the same transmission medium overlap both in frequency and in time. This is in contrast to Frequency Division Multiple Access (FDMA) in which users overlap in time, but are assigned unique frequencies, and Time Division Multiple Access (TDMA) in which users overlap in frequency, but are assigned unique timeslots. According to CDMA, each user is assigned a unique code sequence that allows the user to spread its information over the entire channel bandwidth, as opposed to particular sub-channel(s) in FDMA. Thus, signals from all users are transmitted over the entire channel. To separate out the signals for a particular user at a receiver, cross correlation is performed on the received signal using the same unique user code sequence.

CDMA transmission is well known to those of skill in the art. A comparison between CDMA and FDMA/TDMA may be found in Proakis, "Digital Communications", Chapter 15, which is incorporated herein by reference. Also, an example of a combined approach for minimizing inter-user interference (i.e., combining a Walsh basis within a group and a spreading sequence across groups) is the IS-95 system described in TIA/EIA/IS-95 "Mobile Station Compatibility Standard for Dual Mode Wideband Spread Spectrum Cellular, System", which is incorporated herein by reference.

An IS-95 CDMA system is unique in that its forward and reverse links (i.e., the base station to mobile station and mobile station to base station) have different link structures. This is necessary to accommodate the requirements of a land-mobile communication system. The forward link consists of four types of logical channels, i.e., pilot, sync, paging, and traffic channels, with one pilot channel, one sync channel, up to seven paging channels, and several traffic channels. Each of these forward-linked channels is first spread orthogonally by its Walsh function, and then spread by a pair of short PN sequences (so-called pseudonoise) each of which is a sequence of high data rate bits ("Chips") ranging from −1 to +1 (polar) or 0 to 1 (non-polar). Subsequently, all channels in the system are added together to form the composite spread spectrum signal which is transmitted on the forward link.

The reverse link in the IS-95 CDMA system consists of two types of logical channels, i.e., access and traffic channels. Each of these reverse-link channels is spread orthogonally by a unique long PN sequence; hence each channel is recovered or decoded using the distinct long PN code. In some instances, a pilot channel is not used on the reverse link based on the impracticality of each mobile station broadcasting its own pilot sequence. Additionally, the IS-95 CDMA system uses 64 Walsh functions which are orthogonal to each other (i.e., their cross-product is equal to zero), and each of the logic channels on the forward; link is identified by its assigned Walsh function. The Walsh function is used to generate a code which is used to separate individual users occupying the same RF band to avoid mutual interference on the forward link. The access channel is used by the mobile station to communicate with the base station when a traffic channel is not assigned to the mobile station. The mobile station uses the access channel to generate call originations and respond to pages and orders. The baseband data rate of the access channel is fixed at 4.8 Kilobits per second (Kbps).

The pilot channel is identified by the Walsh function $0(w_0)$. This channel contains no baseband sequence information. The baseband sequence is a stream of 0s which are spread by Walsh function 0, which is also a sequence of all zeros. The resulting sequence (still all 0s) is then spread or multiplied by a pair of quadrature PN sequences. Therefore, pilot channel is effectively the PN sequence itself. The PN sequence with a specified offset uniquely identifies the particular geographical area or sector from which the user is transmitting the pilot signal. In an IS-95 CDMA system, both Walsh function 0 and the PN sequence operate at a rate of 1.2288 mega chips per second (Mcps). After PN spreading, baseband filters are used to shape the resultant digital pulses. These filters effectively lowpass filter the digital pulse stream and control the baseband spectrum of the signal. As a result, the signal band possesses a sharper roll-off near the band edge. The pilot channel is transmitted continuously by the base station sector. The pilot channel provides the mobile station with timing and phase reference. The measurement of the signal-to-noise ratio of the pilot channel by the mobile station also provides an indication of the strongest serving sector of that mobile. Here, the signal-to noise is the energy per chip per interference density, or $E_c/I_0$, where $E_c$ is the energy per chip and $I_0$ is the interference density.

Unlike the pilot channel, the sync channel carries baseband information. The baseband information is contained in the sync channel message which notifies the mobile of information concerning system synchronization and parameters. Similar to the sync channel, the paging channel also carries baseband information. However, unlike the sync channel, the paging channel transmits at a higher rate, i.e., at either 4.8 or 9.6 Kbps.

The forward and reverse traffic channels are used to transmit user data and voice; signaling messages are also sent over the traffic channel. The structure of the forward traffic channel is similar to that of the paging channel, while the structure of the reverse traffic channel is similar to that of the access channel. The only difference is that the forward traffic channel contains multiplexed power control bits (PCBs) and the reverse traffic channel contains a data burst randomizer which is used to generate a masking pattern of 0s and 1s to randomly mask redundant data.

The techniques for separating signals in time (i.e., TDMA), or in frequency (i.e., FDMA) are relatively simple ways of ensuring that the signals are orthogonal and non-interfering. However, in CDMA, different users occupy the same bandwidth at the same time, but are separated from each other via the use of a set of orthogonal waveforms, sequences, or codes. Two real-valued waveforms x and y are said to be orthogonal if their cross correlation $R_{xy}$ over time period T is zero, where $$R_{xy}(0) = \int_0^T x(t)y(t)dt \quad \text{(Eq. 1)}$$

In discrete time, the two sequences x and y are orthogonal if their cross-product $R_{xy}(0)$ is zero. The cross product is defined as $$R_{xy}(0) = x^T y = \sum_{i=1}^{I} x_1 y_i \quad \text{(Eq. 2)}$$

where $$x^T = [x_1 \ x_2 \ ... \ x_I]$$
$$y^T = [y_1 \ y_2 \ ... \ y_I]$$

In this case, T denotes the vector transpose, i.e., a column represented as a row or vice versa. For example, the following two sequences or codes, x and y are orthogonal:
 X$^T$=[−1−111]
 y$^T$=[−111−1]
because their cross-correlation is zero; that is $$R_{xy}(0)=x^Ty=(1-)(-1)+(1-(1)+(1)(1)+(1)(-1)=0 \quad \text{(Eq. 3)}$$

In order for the set of codes to be used in a multiple access scheme, additional properties are required. That is, in addition to the zero cross-correlation property, each code in the set of orthogonal codes must have an equal number of 1s and −1s. This property provides each particular code with the required pseudorandom characteristic. An additional property is that the dot product of each code scaled by the order of the code must equal to 1. The order of code is effectively the length of the code, and the dot product is defined as a scalar obtained by multiplying the sequence by itself and summing the individual terms. This is given by following relationship:

$$R_{xx}(0) = x^T x = \sum_{i=1}^{I} x_i x_i \quad \text{(Eq. 4)}$$

In a CDMA system, a specified segment of each sequence available to a node of the network is designated as a "symbol". In the case of a repetitive sequence, a symbol may be a complete period of the sequence. The time interval during which a node transmits or receives such a symbol is called a "symbol interval". In a multi-node spread-spectrum network employing multiple orthogonal sequences, all the nodes may simultaneously transmit and/or receive information-bearing symbols derived from some or all of the sequences available to nodes.

The increasing use of wireless telephones and personal computers has led to a corresponding demand for such advanced telecommunications techniques as CDMA, FDMA and TDMA, which were once thought to be only meant for use in specialized applications. In the 1980's wireless voice communication became widely available through the cellular telephone network. Such services were at first typically considered to be the exclusive, province of the businessman because of high subscriber costs. The same was also true for access to remotely distributed computer networks, whereby until very recently, only business people and large institutions could afford the necessary computers and wireline access equipment. As a result of the widespread availability of both technologies, the general population now increasingly wishes to not only have access to networks such as the Internet and private intranets, but also to access such networks in a wireless manner as well. This is of particular concern to the users of portable computers, laptop computers, hand-held personal digital assistants and the like who prefer to access such networks without being tethered to a telephone line.

However, there is still no widely available satisfactory solution for providing low cost, broad geographical coverage, high speed access to the Internet, private intranets, and other networks using the existing wireless infrastructure. This situation is a result of several factors. For one, the typical manner of providing high speed data service in the business environment over the wireline network is not readily adaptable to the voice grade service which is available in most homes or offices. Additionally, such standard high speed data services do not lend themselves well to efficient transmission over standard cellular wireless handsets. Furthermore, the existing cellular network was originally designed only to deliver voice services. As a result, the emphasis in present day digital wireless communication schemes lies with voice, although certain schemes such as CDMA do provide some measure of asymmetrical behavior for the accommodation of data transmission. For example, the data rate on an IS-95 forward traffic channel can be adjusted in increments from 1.2 Kbps to up to 9.6 Kbps for so-called Rate Set 1, and for increments from 1.8 Kbps up to 14.4 Kbps for Rate Set 2.

Existing systems therefore typically provide a radio channel which can accommodate maximum data rates only in the range of 14.4 Kbps at best in the forward direction. Such a low rate data channel does not directly lend itself to transmitting data at rates of 28.8 or even 56.6 Kbps which are now commonly available with conventional modem type equipment. Data rates at these levels are rapidly becoming the minimum acceptable rates for activities such as Internet access. Other types of data networks using higher speed building blocks such as Digital Subscriber Line (xDSL) service are just now coming into use. However, the cost of xDSL service has only recently been reduced to the point where it is attractive to the residential customer.

Although xDSL and Integrate Services Digital Network (ISDN) networks were known at the time that cellular systems were originally deployed, for the most part, there is no provision for providing higher speed ISDN or xDSL grade data services over cellular networks. Unfortunately, in wireless environments, access to channels by multiple subscribers is expensive and there is competition for them. Whether the multiple access is provided by the traditional FDMA using analog modulation on a group of radio carriers, or by the newer digital modulation schemes which permit sharing of a radio carrier using TDMA or CDMA, the nature of the radio spectrum is that it is a medium which is expected to be shared. This is quite different from the traditional environment for data transmission, in which the wireline medium is relatively inexpensive to obtain, and is therefore not typically intended to be shared. Accordingly, it is apparent that there is a need to provide a system which supports higher speed ISDN or xDSL grade data services over cellular network topologies. In particular, what is needed is an efficient scheme for supporting wireless data communication such as from portable computers to computer networks such as the Internet and private intranets using widely available infrastructure.

Current wireless standards in widespread use such as CDMA do not provide an adequate structure with which to support the most common activities, such as web page browsing. In the forward and reverse link direction, the maximum available channel bandwidth in an IS-95 type CDMA system is only 14.4 Kbps. Due to IS-95 being circuit-switched, there are only a maximum of 64 circuit-switched users that can be active at one time. In practicality, this limit is difficult to attain, and 20 or 30 simultaneous users are typically active at one time. Furthermore, existing CDMA systems require certain operations before a channel can be used. For example, both access and traffic channels in such systems are modulated by PN sequences. As a result, a search of all possible PN offsets is required for synchronization of the receiver with the transmitter. This is due to the existence of 32,768 PN offsets associated with each base station which must be searched individually. When an adaptive antenna system is used with the receiver, such a search includes both the PN offset and an azimuth angle of the antenna. Furthermore, if the antenna steers nulls on the interferers (i.e., sets the azimuth angle of the antenna toward other transmitters), the overall search will also include another search parameter (i.e., the null steering parameter). Such an iterative search over the PN offsets, the azimuth angle and the null steering is a slow and time consuming process which produces a noticeable synchronization delay to a user of a subscriber unit due to the necessity to search over the additional constraints.

SUMMARY

The present invention is directed to a method for synchronizing a CDMA receiver to a transmitted pilot signal when an adaptive antenna system having circuit elements associated with its radiating elements such that some of the antenna properties are controlled by a received signal is utilized to receive transmitted data. An attractive method of reducing the synchronization delay pattern is to adapt a receiving antenna system between a 360 reception angle pattern (i.e., an omni-directional pattern) and a fixed reception angle (i.e., a directional pattern). This is accomplished by permitting the receiver to identify the pilot signal having the greatest magnitude, as a result of permitting the receiver to minimize interference from other pilot signals by steering antenna pattern nulls toward other transmitters.

A search of each frequency offset at the carrier frequency is performed, which is then followed by a search of the various frequency bins. In the preferred embodiment, the frequency offset is measured in a laboratory and stored in memory for use during an initial acquisition of a pilot signal. During pilot signal acquisition, a PN space at the stored frequency is scanned. If significant pilot signals are not found, then a large frequency offset is present, and the other frequency bins must be searched. On the other hand, if the searcher detects pilots of significant strengths during pilot signal acquisition, a voltage controlled oscillator within the system will posses a negligible frequency offset, and no other frequency bins will be searched. Further, if different frequency bins are searched and pilots signals having significant signal amplitudes strengths are found, the new frequency offset is stored in memory until the initial acquisition of the pilot signal is required.

Upon detection of a potential pilot signal, the state of the short PN code of the pilot signal is stored in a digital signal processor (DSP). If the potential pilot signal passes all the dwells (i.e., the time spent evaluating specific PN offsets), the antenna array then scans for the best angle of arrival in predetermined bin widths (i.e., search windows). In the preferred embodiment, the scan for the best angle of arrival is performed in 20° bins.

The method of the invention eliminates the need to search all possible PN offsets during synchronization of the CDMA receiver with the transmitted pilot signal. The method eliminates the search of additional parameters, such as the null steering parameter. The search over the PN offsets, the azimuth angle and the null steering is eliminated. As a result, synchronization delay is minimized and a rapid acquisition of the transmitted pilot signal is achieved.

BRIEF DESCRIPTION OF THE DRAWINGS

The present invention may be more readily understood by one skilled in the art with reference being had to the following detailed description of the preferred embodiments thereof, taken in conjunction with the accompanying drawings wherein like elements are designated by identical reference numerals throughout the several views, and in which:

FIG. 4 is a plot of the transmission elements of an antenna array;

FIGS. 5A and 5B are a block diagram of a conventional superheterodyne radio;

FIG. 6 is a schematic block diagram of a pilot searcher for implementing the method in accordance with the present invention;

FIGS. 8A and 8B are a flow chart which illustrates the steps of the method according to the invention.

DETAILED DESCRIPTION OF THE PREFERRED EMBODIMENTS

Figure 1:
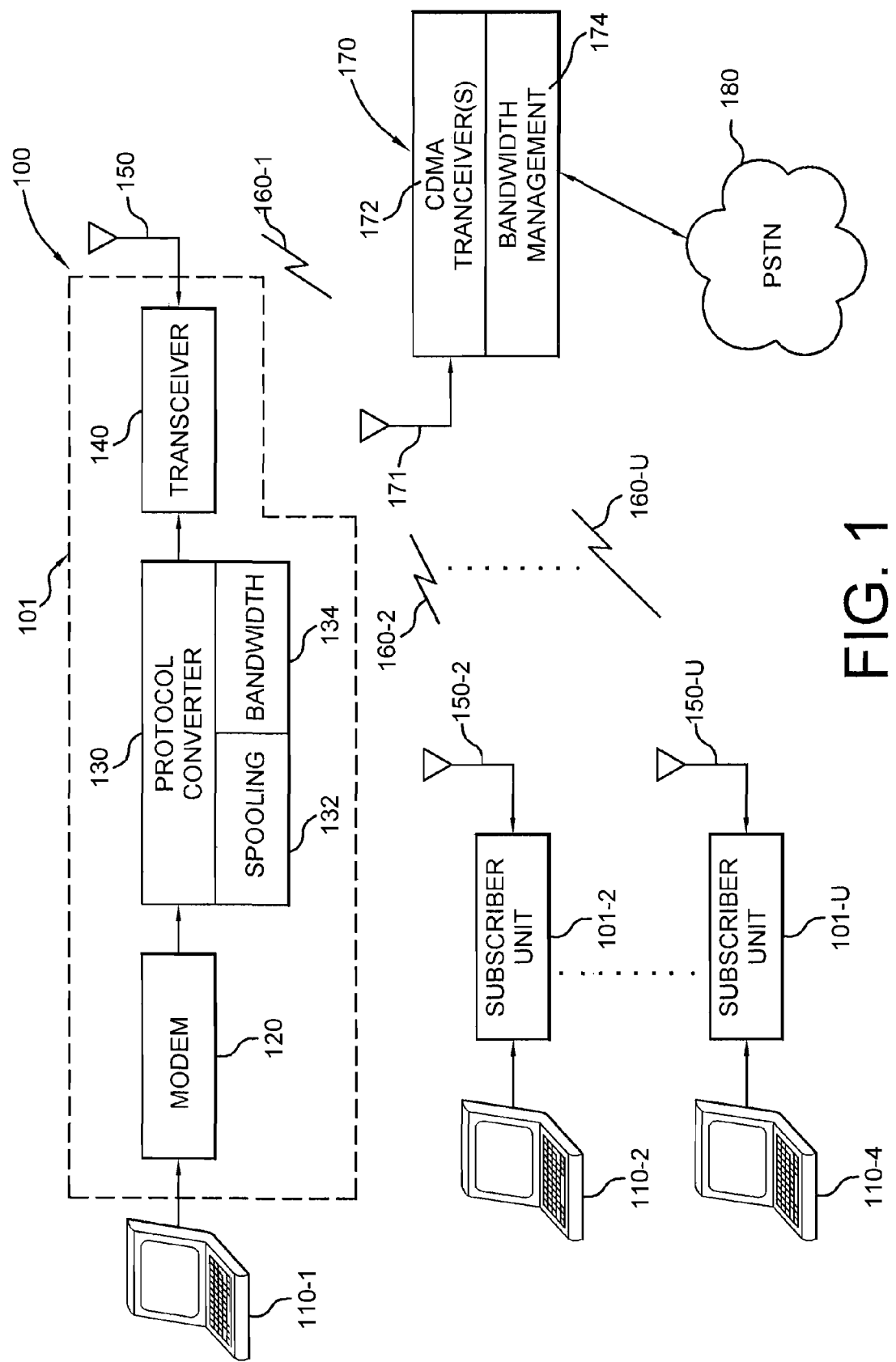
FIG. 1 is a block diagram of a wireless communication system in which a receiving antenna is adapted between an omni-directional pattern and a directional pattern.

FIG. 1 is a block diagram of a wireless communication system 100 in which a receiving antenna is adapted between an omni-directional pattern and a directional pattern. The system 100 includes two different types of components, such as subscriber units 101-1, 101-2, ..., 101-u (collectively, the subscriber units 101) and one or more base stations 170. The subscriber units 101 and base stations 170 cooperate to provide the functions necessary in order to provide wireless data services to a portable computing device 110 such as a laptop computer, portable computer, personal digital assistance (PDA) or the like associated with a subscriber unit 101. The base station 170 also cooperates with the subscriber units 101 to permit the ultimate transmission of data to and from the subscriber unit 101 and the public switch telephone network (PSTN) 180. More particularly, data and/or voice services are also provided by the subscriber unit 101 to the portable computer 110 as well as one or more of the devices such as telephones. The telephones themselves may in turn be connected to other modems and computers which are not shown in FIG. 1.

The subscriber unit 101 itself may include a modem, such as an ISDN modem 120, a device referred to herein as a protocol converter 130 which performs various functions including spooling 132 and bandwidth management 134, CDMA transceiver 140, and subscriber unit antenna 150. The various components of the subscriber unit 101 may be realized in discrete devices or as an integrated unit. For example, an existing conventional ISDN modem 120 such as is readily available from any number of manufactures may be used together with existing CDMA transceivers 140. In this case, the necessary additional functions may be provided entirely by the protocol converter 130 which may be sold as a separate device. Alternatively, the ISDN modem 120, protocol converter 130 and CDMA transceiver 140 may be integrated as a complete unit and sold as a single subscriber unit device 101.

Other types of interface connections such as Ethernet or PCMCIA may be used to connect the computing device to the protocol converter 130. The device may also interface to an Ethernet interface rather than an ISDN "U" interface.

The ISDN modem 120 converts data and voice signals between the format used by the terminal equipment 110 and the format required by the standard ISDN "U" interface The U interface is a reference point in ISDN systems that designates a point of the connection between the network termination (NT) and the telephone company.

The protocol converter 130 performs spooling 132 and basic bandwidth management 134 functions. In general, spooling 132 includes insuring that the subscriber unit 101 communicates with the terminal equipment 110 which is connected to the public switched telephone network 180 on the other side of the base station 170 at all times. The bandwidth management function 134 is responsible for allocating and deallocating CDMA radio channels 160 as required. Bandwidth management 134 also includes the dynamic management of the bandwidth allocated to a given session by dynamically assigning sub-portions of the CDMA radio channels 160. The CDMA transceiver 140 accepts the data from the protocol converter 130 and reformats the data into the appropriate form for transmission through the subscriber unit antenna 150 over CDMA radio link 160-1. The CDMA transceiver 140 may operate over only a single 1.25 MHz radio frequency channel, or may be tunable over multiple allocatable radio frequency channels.

CDMA signal transmissions from the subscriber units 101 are received and processed by the base station equipment 170. The base station equipment 170 typically includes multichannel antennas 171, multiple CDMA transceivers 172 and a bandwidth management functional 174. Bandwidth management 174 controls the allocation of CDMA radio channels 160 and subchannels, in a manner analogous to the subscriber unit 101. Transceiver 172 demodulates the received signal, and the base station 170 then couples the demodulated radio signals to the public switch telephone network (PSTN) 180 in a manner which is well known in the art. For example, the base station 170 may communicate with the PSTN 180 over any number of different efficient communication protocol such as primary rate ISDN, or other LAPD based protocols such as IS-634 or V5.2.

It should also be understood that data signals travel bidirectionally across the CDMA radio channels 160. In other words, data signals received from the PSTN 180 are coupled to the portable computer 110 and a forward link direction, and data signals originating at the portable computer 110 are coupled to the PSTN 180 in a so-called reverse link direction.

Each of the CDMA transceivers such as transceiver 140 in the subscriber unit 101, and transceiver 172 in the base station 170, is tunable at any given point in time to a given 1.25 MHz radio frequency channel. It is generally understood that such a 1.25 MHz radio frequency carrier provides, at best, a total equivalent of about 500-600 Kbps maximum data rate transmission within acceptable bit error rate limitations. Within each transceiver 140 is a pilot searcher 201 which is used to search for a valid pilot signal among multipath pilot signals (i.e., reflected pilot signals).

Figure 2:
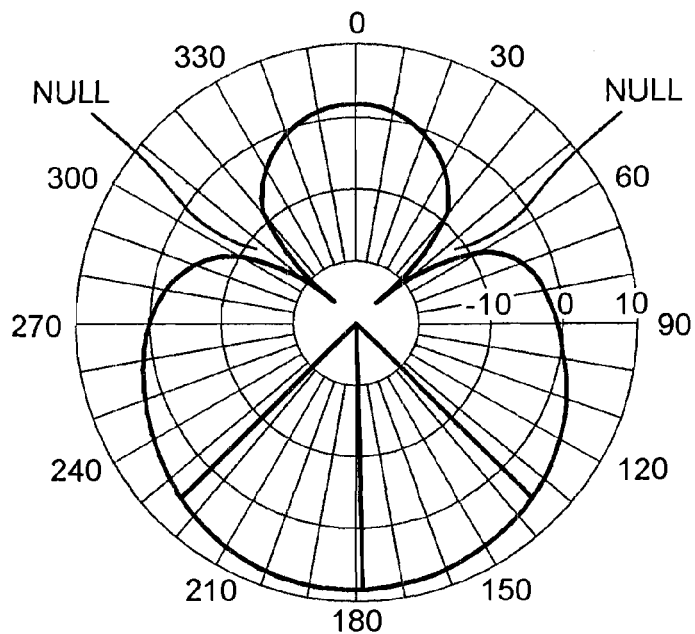
FIG. 2 is an azimuth plot of a ¼ wave monopole array over Two Medium Ground Structure.

FIG. 2 is an azimuth plot of a ¼ wave monopole array antenna over Two Medium Ground Structure. At a particular azimuth, the antenna exhibits an attenuation in the amplitude of the received signal. In FIG. 2, this attenuation, or null, is indicated at 50° and 310, respectively.

Figure 3:
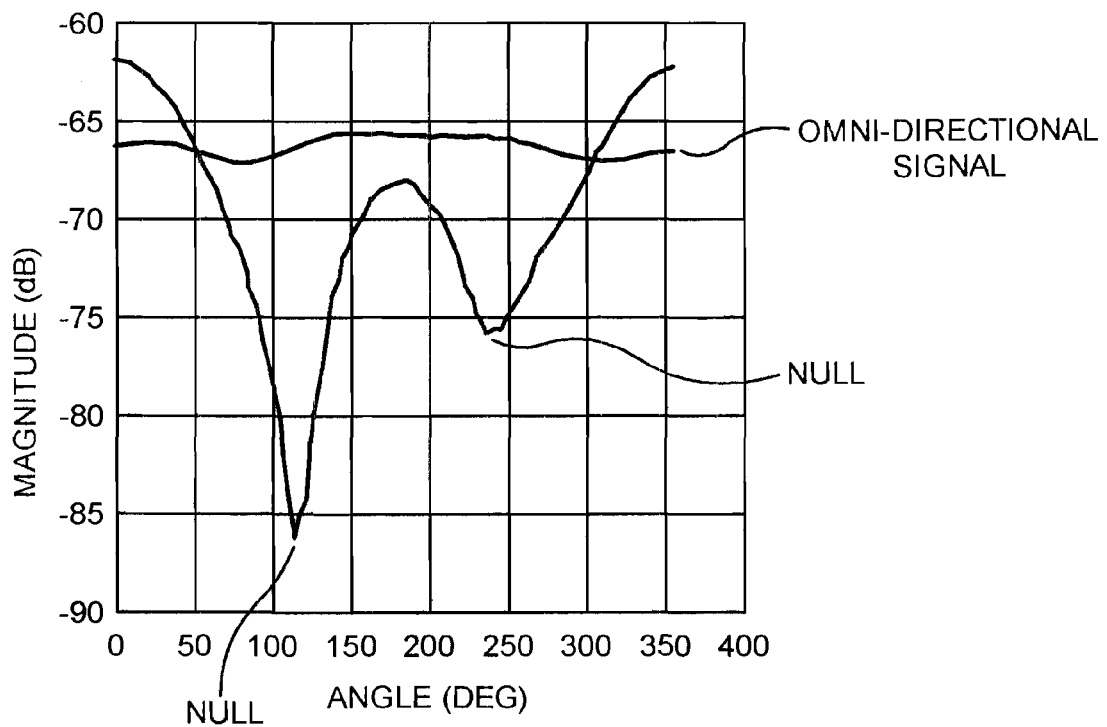
FIG. 3 is a magnitude vs. angle plot of a monopole array.

FIG. 3 is a magnitude vs. angle plot of a monopole array antenna. During transmission, the amplitude of a transmitted signal may have nulls at a particular angle. In FIG. 3, a large null in the antenna pattern signal is shown at approximately 117°, with a smaller null occurring at approximately 240. When antenna pattern nulls are steered toward other transmitters, a minimization of interference from other pilot signals is achieved. As a result, pilot signals having the greatest magnitude become more easily and more accurately identified.

Figure 5A:
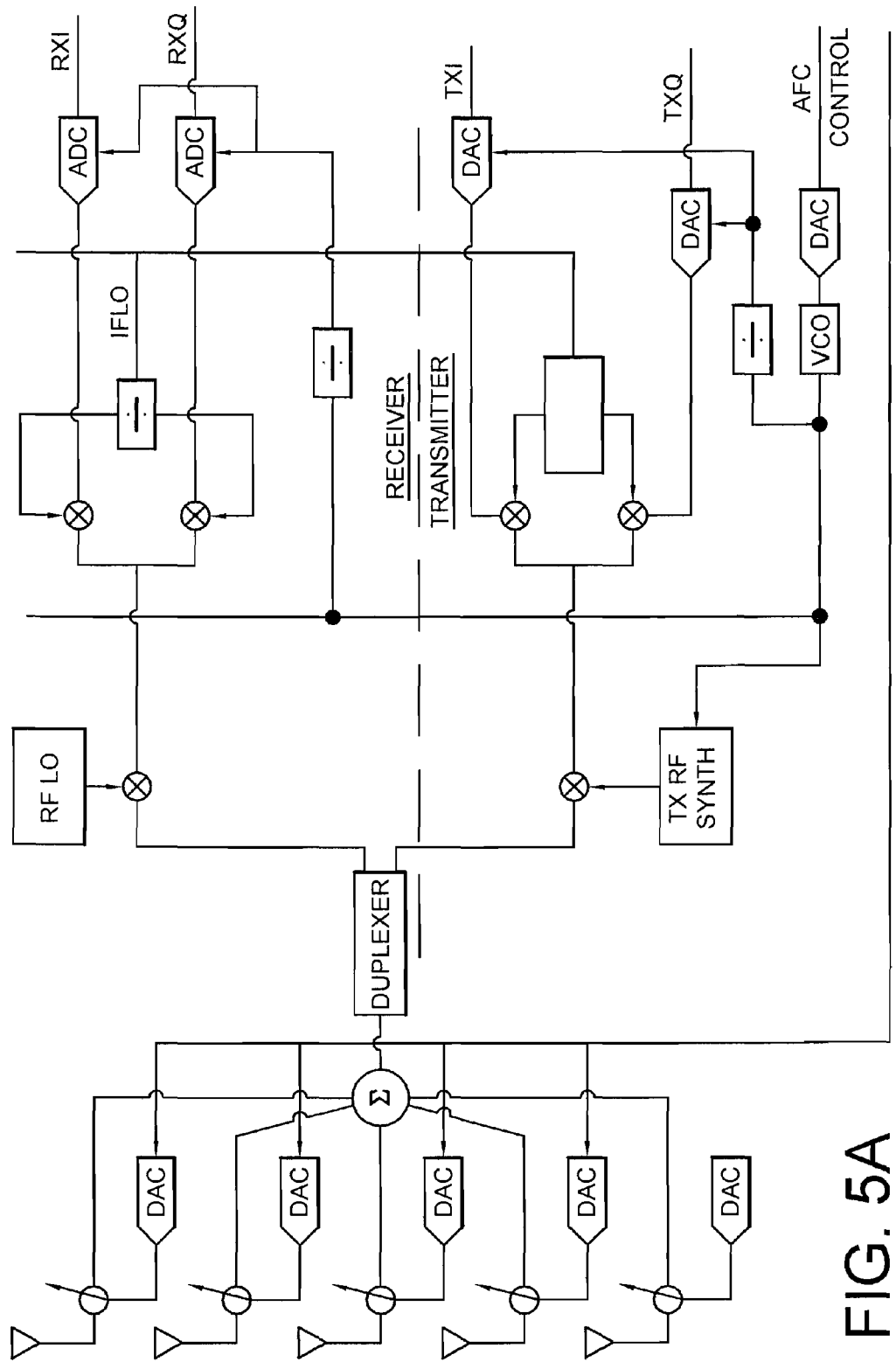

FIG. 4 is a plot of the transmission elements of a phased array steerable fixed antenna system of a conventional superheterodyne radio shown in FIGS. 5A and 5B. Shown in FIG. 4 are four perimeter elements 40 and one center element 45. During "steering" of the phased antenna array system 5 shown in FIG. 5A, the phase of the perimeter elements are adjusted relative to the center element 45 of the antenna system 5. Steering is achieved by utilizing a digital to analog converter (not shown) to up-load a specific phase angle to a respective phase shifter (not shown) which is attached to each element such that the antenna system 5 is caused to point toward a specific corresponding phase angle. This corresponding phase angle is typically stored in memory (not shown), such as a look up table.

FIG. 6 is a schematic block diagram of the pilot searcher 201 for the wireless communication system 100 in which the method according to the present invention is implemented. Specifically, FIG. 6 is a block diagram of a pilot searcher portion of a transceiver 140. Initially, pilot searcher 201 is used to search for a valid pilot signal among multipath pilot signals (i.e., reflected pilot signals). During the initial search, the antenna array weights (elements) are set to provide an omnidirectional pattern. An omnidirectional pattern is obtained by setting the phase of the perimeter elements to zero degrees and the phase: of the middle element to 90 degrees, i.e., by steering the antenna angle to obtain the specified angles. Once a valid pilot signal is located, the antenna array searches the azimuth angle associated with a received pilot signal to determine the angle of arrival at which the received pilot signal is at its peak. This angle of arrival is forwarded along with the amplitude of the pilot signal to a microcontroller (not shown) within the system for further processing.

As shown in the FIG. 6, demodulated I and Q sub-band data signals are modulated in Quadrature Phase Shift Key (QPSK) modulator 220 by PN generator 210 (I and Q represent the in-phase portion and quadrature portion of the data signal, respectively). At nodes 230 and 240, the I and Q sub-band data outputs of the QPSK modulator 220 are respectively integrated. Next, the I and Q sub-band data signals are squared, at node 250 and node 260, respectively. The squared outputs from node 250 and node 260 are input to summer 270, where they are added together. This summed result is output to integrator 280.

After the integration of the summed I and Q sub-band data signals in the integrator 280, multi-dwell detection is performed in threshold setting device 291 (a multi-dwell searcher). Upon detection of a valid pilot signal, the detected pilot signal is assigned to an element of the antenna. A valid correlation occurs when a signal at a specific PN offset is located. At each valid correlation, the PN offset is used to demodulate I & Q sub-band data signals (i.e., despread incoming waveform at the specific PN offset).

The pilot channel signal accounts for approximately 10% of the total forward link transmitted power. This, coupled with the pilot signal being non-orthogonal to the data, requires the searcher algorithm to perform longer coherent integration (i.e., integration which includes phase information), as compared to the coherent integration performed in such systems as IS95. In the presence of large frequency offsets between the base station 170 and a subscriber unit 101, the magnitude of the values output by the integrator 280 become small and limited. This limits the ability of the subscriber to detect PN offsets. As a result, large coherent integration (or a longer coherent integration) can only be achieved by stepping the frequency synthesizer into multiple frequency bins (multiple frequency ranges) starting from the ideal carrier frequency.

Figure 7:
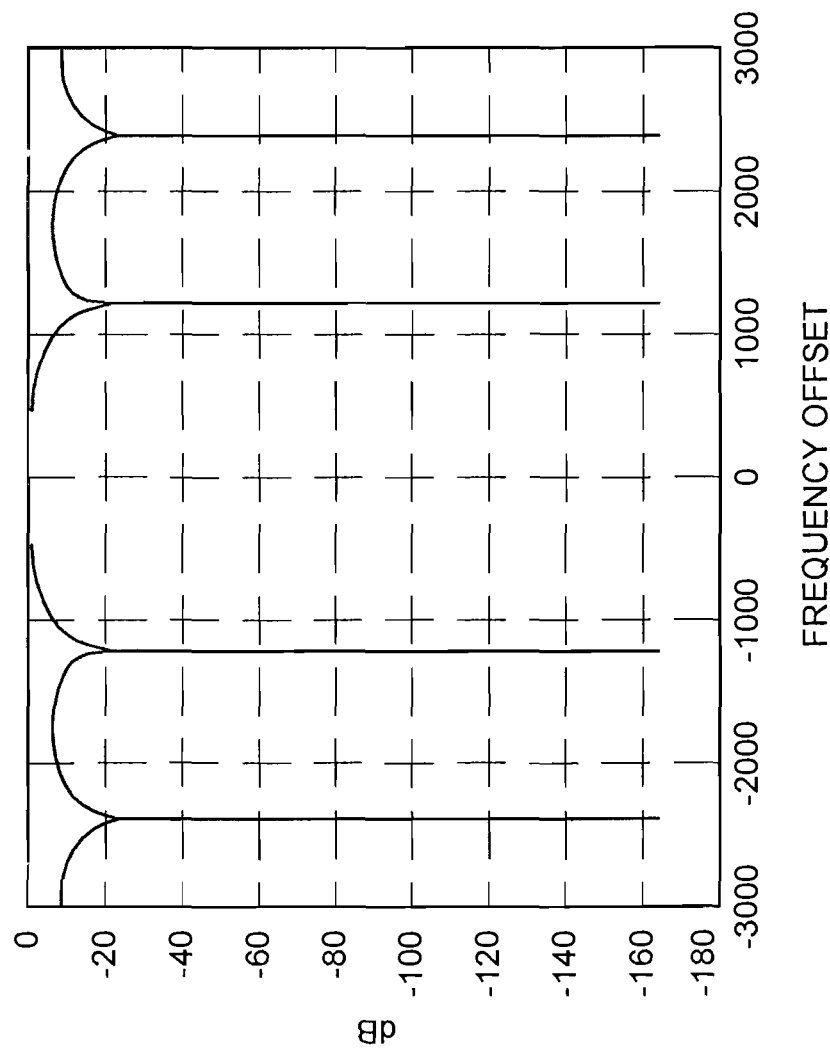
FIG. 7 is a graph of a frequency offset curve after performance of an integration and dump function.

An automatic frequency control loop is stepped as a result of the unknown frequency offset due to oscillator mismatch between the base station and the subscriber station 101. (This frequency mismatch can be as high as 2.5 ppm of 1.9 GHz or approximately 5 KHz.). A coherent integration length of 32 symbols (i.e., $2^{10}$ chips) results in the detection curve shown in FIG. 7. As seen in FIG. 7, a frequency offset of ±200 Hz results in an approximately 2 dB loss of pilot detection power, whereas an offset of ±400 Hz may cause a pilot estimation power degradation of up to 13 dBs. Therefore, to ensure proper pilot signal detection, the pilot searcher is set such that it steps through frequency bins of approximately 200 Hz. In the preferred embodiment, the starting point for steeping through the bins is at the exact carrier frequency of the pilot signal, and the frequency bins are stepped at increments of ±200 KHz, ±400 Hz, and on.

In accordance with the invention, a search of each frequency offset at the carrier frequency is performed, which is then followed by a search of the various frequency bins. In the preferred embodiment, the frequency offset is measured in a laboratory and stored in memory. During pilot signal acquisition, a PN space at the stored frequency is scanned. If significant pilot signals are not found, then a large frequency offset is present, and the other frequency bins must be searched. On the other hand, if the searcher detects pilots of significant strengths during pilot signal acquisition, a voltage controlled oscillator (not shown) within the system will posses a negligible frequency offset, and no other frequency bins will be searched. Further, if different frequency bins are searched and pilots signals having significant signal amplitudes strengths are found, the new frequency offset is stored in memory until an initial acquisition of a pilot signal is required.

Upon detection of a potential pilot signal, the state of the short PN code of the pilot signal is stored in a digital signal processor (DSP). If the potential pilot signal passes all the dwells (i.e., the time spent evaluating specific PN offsets), the antenna array then scans for the best angle of arrival in predetermined bin widths (i.e., search windows). In the preferred embodiment, the scan for the best angle of arrival is performed in 20° bins. A 20 angle offset induces approximately 0.3 dB loss in signal power, whereas a 40° angle offset may deteriorate the pilot signal by approximately 1 dB, as shown in FIG. 7.

Figure 8B:
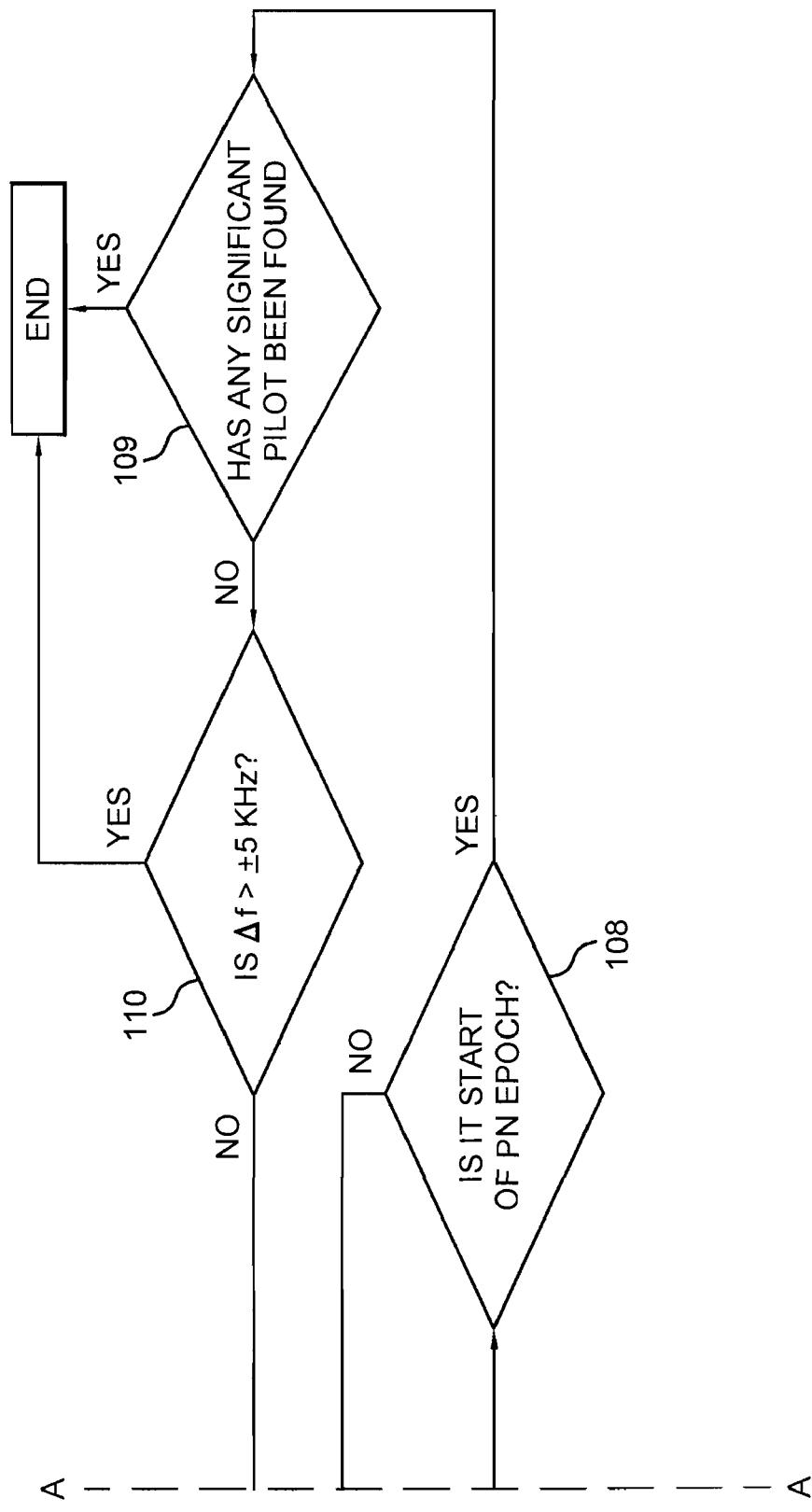

FIGS. 8A and 8B are a flow chart of the method according to the invention. Initially, both factory stored and initial frequency offsets are stored in memory, such as a look-up table (not shown). At the beginning of a transmission session, if service was available and before terminating the call, the final frequency offset is stored in memory as the initial frequency offset (▲f).

To implement the method according to the invention, the final frequency offset (▲f) which was stored at the end of the transmission session is retrieved from memory, as indicated in step 102. Next, the short PN and Gotleber codes are initialized to zero (0) phase, as indicated in step 103. A threshold comparison of the incoming signal (i.e., a comparison of the output of the integrator 280) is performed in the multi-dwell searcher 291 to determine, whether or not a measured peak is at an adequate signal level, as indicated in steps 104a-104e. At each step, the dwell of the output signal of the pilot searcher is checked to determine whether its magnitude is greater than a given threshold. If the dwell is less than the given threshold, the PN code of the pilot signal is adjusted by a quarter chip or an eighth chip interval (i.e., the slew rate is adjusted), as indicated in step 107.

Next, the PN signal is checked to determine whether a start of an epoch is occurring, as indicated in step 108. If a start of an epoch is not occurring, a return to steps 104a-104d occurs (i.e., the dwell calculations are performed). If on the other hand, a start of a PN epoch is occurring, then a determination is made whether a significant pilot has been found, as indicated in step 109. If a significant pilot signal is located, then the pilot signal is assigned to an element of the antenna system (finger assignment) and the process is terminated.

If no significant pilot signal is located, ▲f is then checked to determine whether it is greater than a predetermined threshold, as indicated in step 110. If this is the case, i.e. ▲f is greater than a predetermined threshold, then the process is terminated. However, if ▲f is not greater than the predetermined threshold, then ▲f is increased by a predetermined value, and a return to step 103 occurs, where the short PN and Gotleber codes are initialized to zero phase. In the preferred embodiment, the predetermined threshold is ±5 KHz and predetermined value is ±600 Hz.

Subsequent to completion of the dwell processes illustrated in steps 104a-104e, if the PN threshold is greater than the thresholds enumerated therein, an optimum antenna angle is determined in 20° increments, as indicated in step 105. Once the optimum antenna angle is determined, the finger assignment is updated (step 106) and a return to step 107 occurs, where the slew code is adjusted.

Using the method of the invention, an elimination of the search of all possible PN offsets during synchronization of the CDMA receiver with the transmitted pilot signal is achieved. The method also eliminates the search of additional parameters, such as the null steering parameter. As a result, synchronization delay is minimized and a rapid acquisition of the transmitted pilot signal is achieved.

While the invention has been particularly shown and described with reference to a preferred embodiment thereof, it will be understood by those skilled in the art that various changes in form and details may be made therein without departing from the spirit and scope of the invention.

What is claimed is:

1. A method of searching for, and optimizing reception of, a pilot signal in wireless communications, comprising:
    setting an antenna to an omnidirectional receiving pattern;
    loading a frequency offset stored in an offset memory;
    setting a pseudorandom number (PN) sequence offset to zero;
    detecting a signal from the antenna;
    comparing a magnitude of the signal to a first threshold;
    on a condition that a PN epoch is beginning:
        determining whether a valid pilot signal is present for the frequency offset, PN offset, and antenna receiving pattern; and
        on a condition that a valid pilot signal is not detected, changing the frequency offset by a predetermined offset increment on a condition that the frequency offset is less than a second threshold,
        and repeating the setting a PN sequence offset to zero; and
        on a condition that a valid pilot signal is detected, ending the method; and on a condition that a PN epoch is not beginning, repeating the comparing.

2. The method of claim 1, further comprising:
on a condition that the signal magnitude is greater than the first threshold, increasing the first threshold to a new first threshold; and
on a condition that the magnitude is less than the new first threshold, changing the PN offset by a predetermined offset increment.

3. The method of claim 1, further comprising:
on a condition that the signal magnitude exceeds a predetermined maximum threshold:
  changing the receiving pattern of the antenna from omnidirectional to directional;
  sweeping a reception angle of the antenna in predetermined increments;
  determining a peak reception angle for the antenna at which the pilot signal is at its peak and storing the peak reception angle;
  changing the PN offset by the predetermined offset increment; and
  on a condition that a PN epoch is beginning, repeating the determining whether a valid pilot signal is present for the frequency offset, changed PN offset, and directional antenna receiving pattern.

4. The method of claim 1 further comprising:
on a condition that a valid pilot signal is not detected, adjusting the first threshold; and
repeating the detecting and comparing to the adjusted first threshold.

5. A wireless transmit/receive unit (WTRU) configured to search for, and optimize reception of, a pilot signal in wireless communications, comprising:
  an antenna array;
  steering circuitry configured to set the antenna array to a receiving pattern selected from a plurality of receiving patterns, wherein the plurality of receiving patterns includes an omnidirectional receiving pattern and directional receiving patterns;
  an offset memory configured to store a frequency offset;
  pseudorandom number (PN) sequence generation circuitry having a variable PN offset;
  detection circuitry configured to detect a signal from the antenna array and compare a magnitude of the signal to a first threshold;
  epoch processing circuitry configured to determine whether a PN epoch is beginning;
  pilot signal circuitry configured to determine whether a valid pilot signal is present for the frequency offset, PN offset, and antenna receiving pattern; and to end the searching on a condition that a pilot signal of a desired magnitude is detected, wherein the pilot signal circuitry operates on a condition that the epoch processing circuitry determines that a PN epoch is beginning; and
  offset circuitry configured to change the frequency offset by a predetermined offset increment on a condition that a valid pilot signal is not detected, wherein the offset circuitry operates on a condition that the epoch processing circuitry determines that a PN epoch is beginning.

6. The WTRU of claim 5, further comprising threshold circuitry configured to increase the first threshold to a new first threshold on a condition that the signal magnitude is greater than the first threshold, the offset circuitry being further configured to change the PN offset by a predetermined offset increment on a condition that the magnitude is less than the new first threshold.

7. The WTRU of claim 5, wherein the steering circuitry is further configured to:
  change the receiving pattern of the antenna from omnidirectional to directional on a condition that the signal magnitude exceeds a predetermined maximum threshold; and
  sweep a reception angle of the antenna in predetermined increments.

8. The WTRU of claim 7, further comprising peak detection circuitry configured to determine a peak reception angle of the antenna at which angle the pilot signal is at its peak and to store the peak reception angle.

9. The WTRU of claim 6 wherein the threshold circuitry is further configured to adjust the first threshold on a condition that the pilot signal circuitry determines that a valid pilot signal is not detected.

* * * * *